A. McKIBBIN.
AUTOMATIC CONTROLLER.
APPLICATION FILED JULY 31, 1918.
1,345,383.
Patented July 6, 1920.
4 SHEETS—SHEET 2.
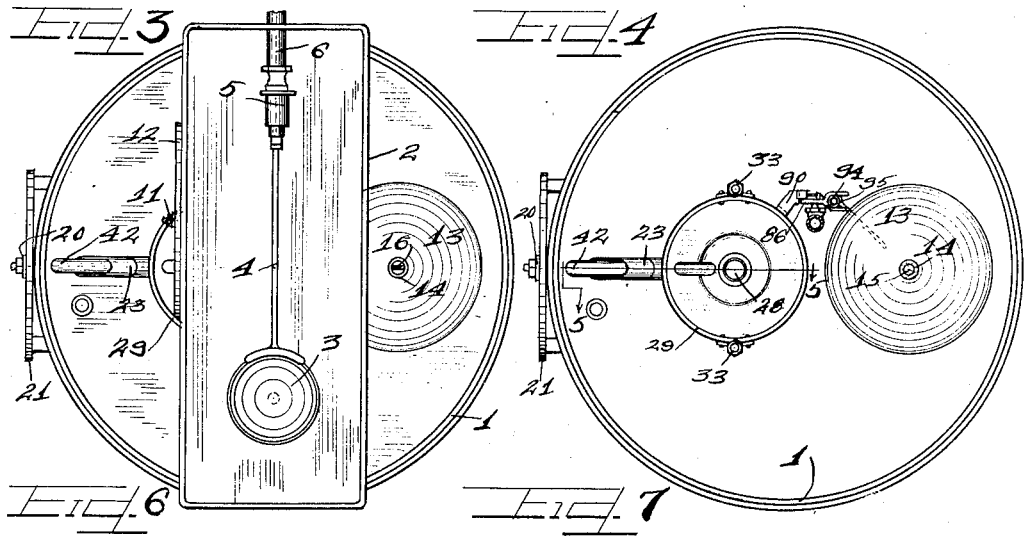
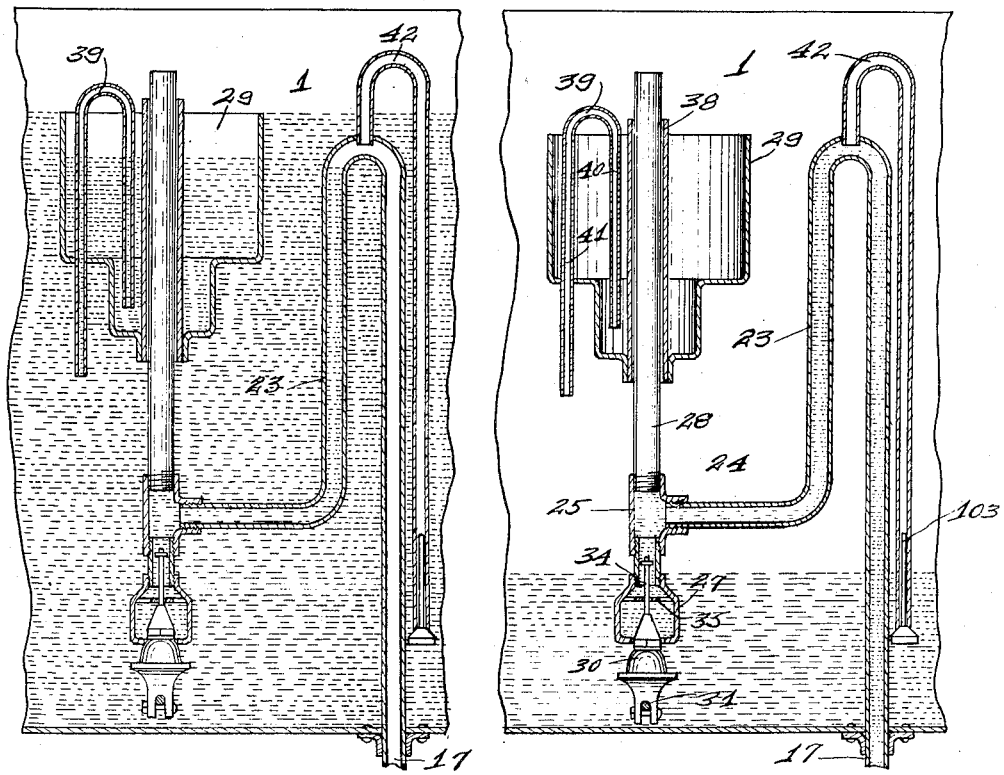
Witnesses
Rudolph J. Berg
Charles Hill Jr.
Inventor
Alexander McKibbin
By Charles W. Hill Atty.

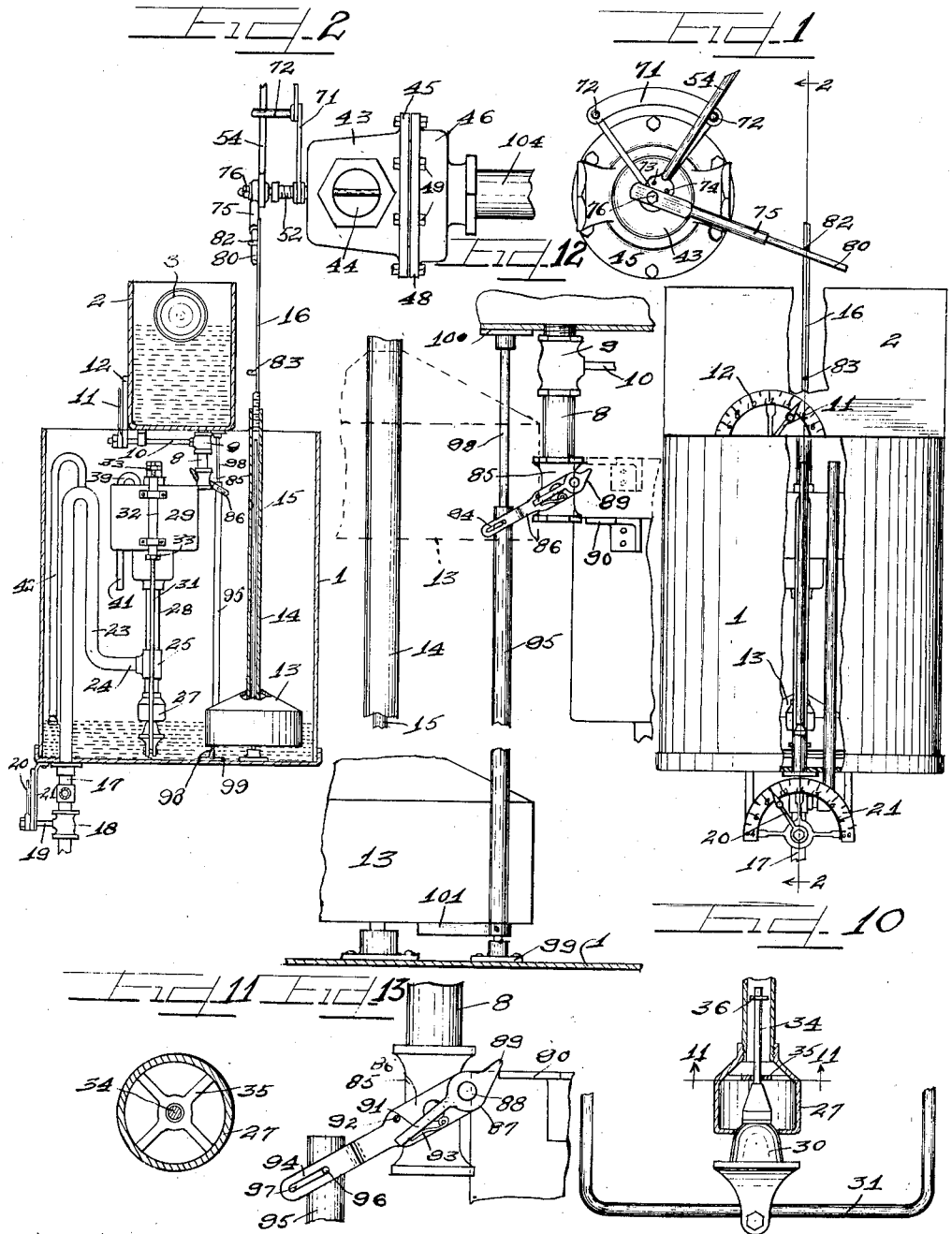

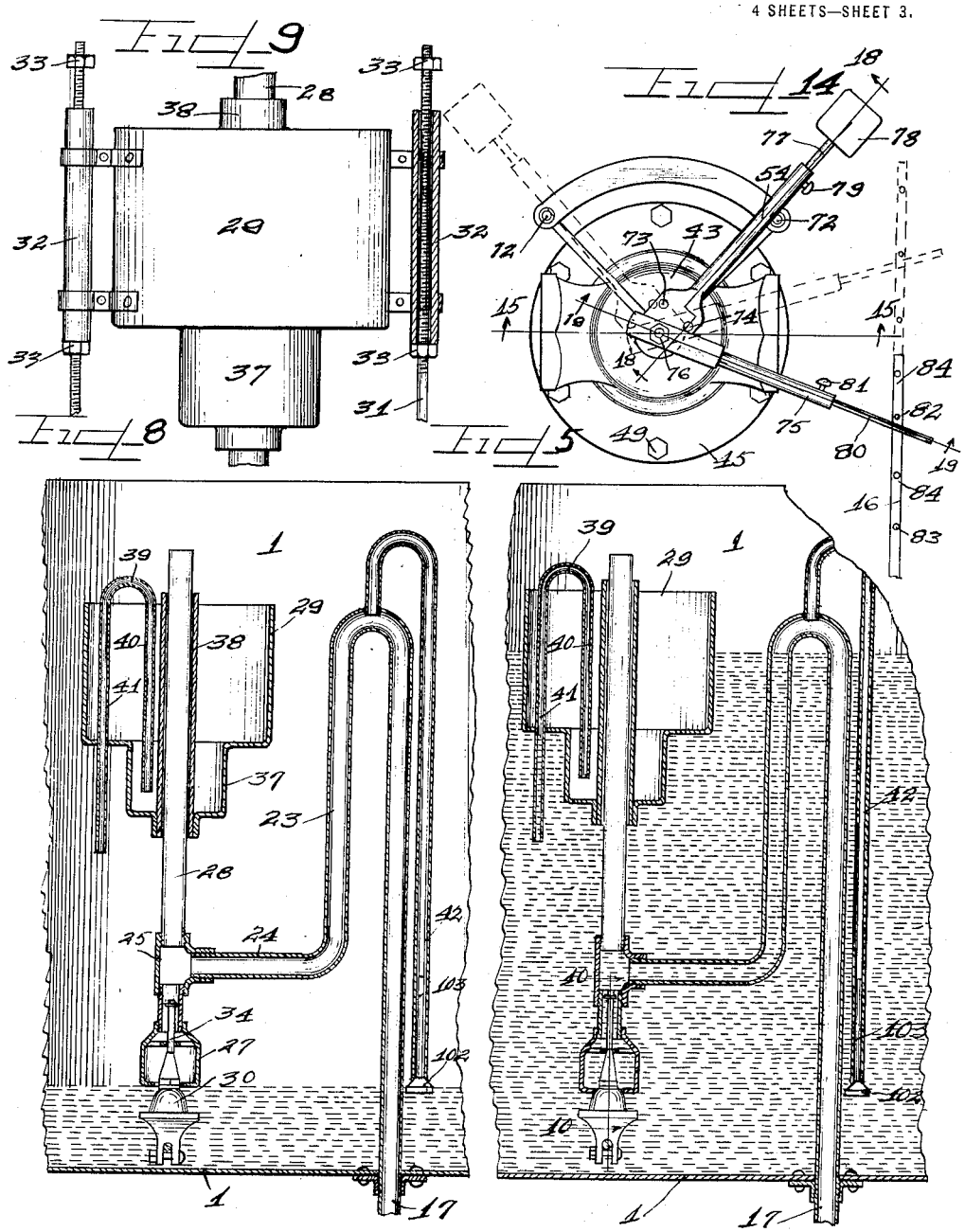

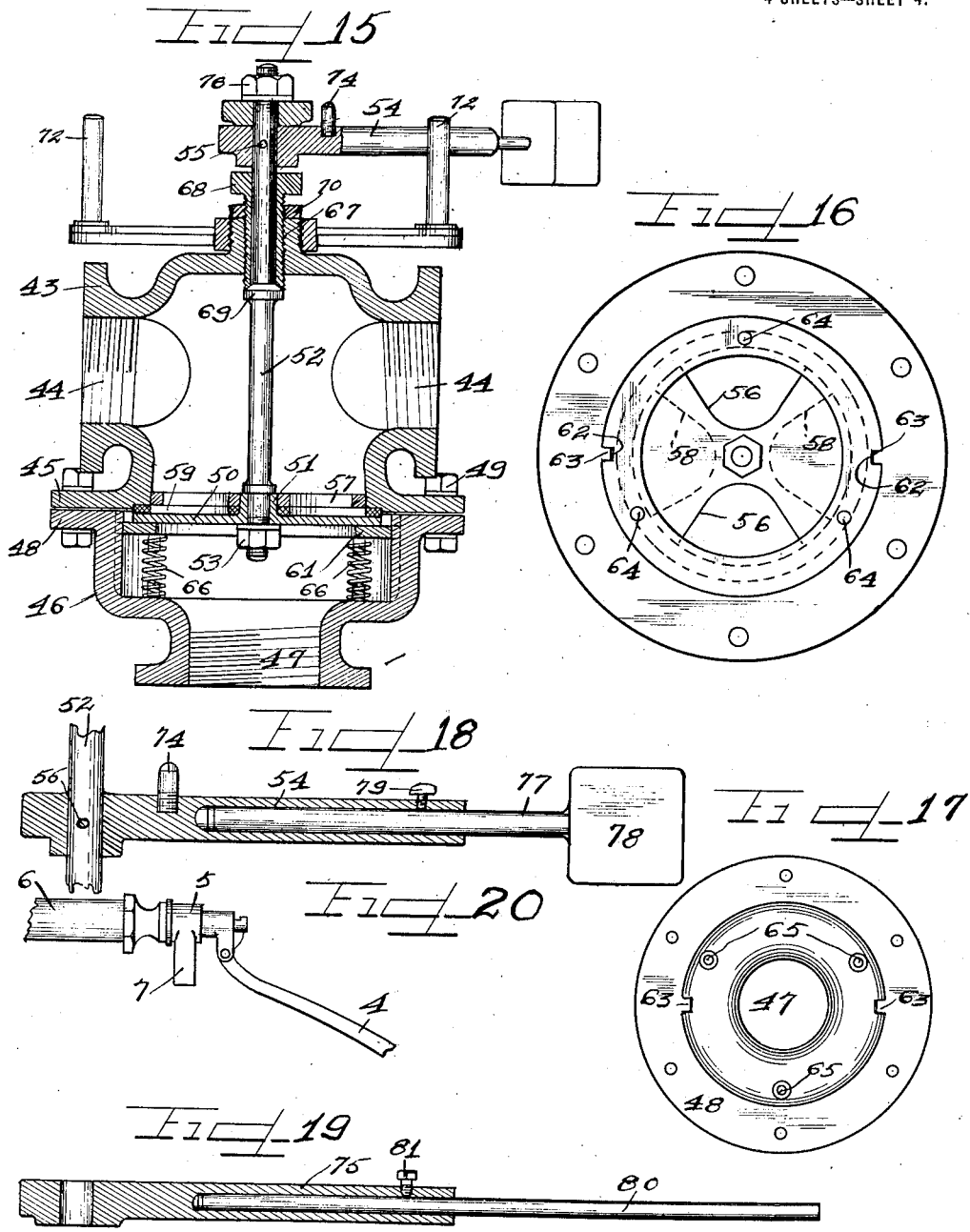

UNITED STATES PATENT OFFICE.

ALEXANDER McKIBBIN, OF CHICAGO, ILLINOIS.

AUTOMATIC CONTROLLER.

1,345,383.  Specification of Letters Patent.  Patented July 6, 1920.

Application filed July 31, 1918. Serial No. 247,701.

*To all whom it may concern:*

Be it known that I, ALEXANDER MCKIBBIN, a citizen of the United States, and a resident of the city of Chicago, in the county of Cook and State of Illinois, have invented certain new and useful Improvements in Automatic Controllers; and I do hereby declare that the following is a full, clear, and exact description of the same, reference being had to the accompanying drawings, and to the numerals of reference marked thereon, which form a part of this specification.

My invention has reference more particularly to a device, controlled by regulating the flow of liquid therethrough, for operating mechanism connected therewith at a predetermined time.

This device may be used in connection with any mechanism the operation of which is to be controlled at predetermined times, but is particularly useful in connection with heating systems of apartment buildings and other similar buildings to enable the heat to be turned on or off at a predetermined time without requiring the attention of the operator.

It is an object of my invention to provide a device the operation of which is controlled by regulating the flow of liquid therethrough, and which is adapted to control the operation of other mechanisms at predetermined times.

Another object of my invention is to provide a device operated by regulating the flow of liquid therethrough so as to periodically start and stop another mechanism.

Another object of my invention is to provide a receptacle for liquid and means therein regulated by change in level of the liquid in the receptacle for controlling the operation of another mechanism, together with an automatic siphoning device in the receptacle for controlling the discharge of liquid from the receptacle.

Another object of my invention is to provide a quick acting valve which is particularly adapted for use with an automatic device whereby the valve is operated at predetermined periods.

My invention also has other important objects which will appear from the following specification and the accompanying drawings, in which I have described and illustrated my invention in a preferred form.

On the drawings:

Figure 1 is a side view, with parts broken away, of a device embodying my invention.

Fig. 2 is a sectional view on the line 2—2 of Fig. 1.

Fig. 3 is a top view of the device shown in Fig. 1, with the valve controlled by the timing device omitted.

Fig. 4 is a similar view with the auxiliary tank omitted.

Fig. 5 is an enlarged fragmentary sectional view on the line 5—5 of Fig. 4, with the main tank nearly filled and the float for controlling the siphon valve in the elevated position and holding the valve closed.

Fig. 6 is a view similar to Fig. 5, showing the position of the parts when the main tank is filled and the siphon valve ready to open.

Fig. 7 is a similar view showing the main tank nearly emptied.

Fig. 8 is a similar view showing the parts in the main tank as the latter is drained to the lowest level.

Fig. 9 is an enlarged side view of the float for controlling the siphon valve.

Fig. 10 is an enlarged sectional view on the line 10—10 of Fig. 5, with parts in elevation and shows the siphon controlling valve.

Fig. 11 is an enlarged sectional view on the line 11—11 of Fig. 10.

Fig. 12 is a fragmentary view with intermediate portions of various parts broken away, showing the float operated valve and operating mechanism therefor for controlling the flow of liquid from the auxiliary tank.

Fig. 13 is an enlarged side view of the float operated valve lever.

Fig. 14 is a side view of the valve operated by the timing device.

Fig. 15 is an enlarged sectional view on the line 15—15 of Fig. 14.

Fig. 16 is a view showing the internal construction of the valve looking at the bottom of Fig. 15, with the valve cap 46 removed.

Fig. 17 is a view looking at the inside of the valve cap 46.

Fig. 18 is an enlarged sectional view on the line 18—18 of Fig. 14, with parts in elevation and shows the weighted lever for operating the valve.

Fig. 19 is an enlarged sectional view on the line 19—19 of Fig. 14, of the trip lever for the valve.

Fig. 20 is an enlarged side view of the float operated inlet valve of the auxiliary tank of the device.

As shown on the drawings:

The reference numeral 1 indicates the main tank or receptacle, which may be cylindrical as shown or otherwise, and has a smaller auxiliary tank 2 mounted at the top thereof and preferably elongated as shown in Fig. 3 to accommodate a float 3, which is connected by means of the lever 4 to operate an inlet valve 5 which is connected with the inlet pipe 6 and has an outlet pipe 7 (Fig. 20) therefrom, which discharges into the receptacle 1. The detail construction of the valve 5 is not shown, as this type of valve is well known and I employ any valve of well-known construction which is adapted to be closed when the float 3 is raised by the water in the receptacle to a predetermined level and is opened when the float is depressed, and admits water to the receptacle 2 and thereby automatically maintains a uniform level in the receptacle 2 at all times.

Leading from the bottom of the tank 2 so as to discharge in the receptacle 1 is an outlet pipe 8 controlled by a valve 9 with an operating stem 10 for regulating the opening through the valve 9 and there is an indicator hand 11 at the end of the steam 10, the outer end of which moves across the face of an arcuate dial 12, which in the form of device illustrated is on the side of the tank 2 and the valve 9 is constructed and the markings on the dial 12 arranged so as to indicate the length of time which will be required when the valve and indicator hand 11 are set at a certain position, to fill the tank 1 to the level at which the automatic mechanism therein is set in operation.

Mounted in the tank 1, to move vertically so as to be actuated by the rise and fall of the level of the fluid in the tank is a float 13, which has a tubular stem 14, adapted to slide on the rod 15, which is secured to the bottom of the tank 1, and extends vertically thereabove and serves as a guide for the float 13. The upper end of the tube 14 is connected by means of a rod 16 with a valve or other device which is designed to be automatically controlled by this timing device, and which is actuated as hereinafter more particularly noted by the rise and fall of the float 13, in the receptacle 1.

Extending through the bottom of the receptacle 1, is an outlet pipe 17, which is also provided with a valve 18 for controlling the flow of liquid therethrough, and this valve has a stem 19 with an indicator hand 20 the outer end of which moves across an arcuate dial 21, which is supported from the bottom of the tank 1, and the valve 18 is constructed and the graduations on the dial 21 arranged so that when the hand 20 is moved to a certain position on the dial it will indicate the length of time required to empty the receptacle 1 to a point at which the mechanism controlled by the float 13 is operated.

In order to effect an accurate and dependable operation of the device it is necessary that filling of the receptacle 1, to a predetermined level may be assured before it starts to empty, and this is effected by the following construction. The outlet pipe 17 extends up through the bottom of the receptacle 1 to a point adjacent the upper level of liquid in the receptacle and is then bent downwardly as at 23 to form an inverted U-shaped tube, through which the liquid is required to be siphoned to effect a discharge thereof from the receptacle. The lower end of the pipe 23 is bent laterally as at 24, and connected with a T-coupling 25, the lower arm of which has the valve housing 27 connected therewith, and the upper arm of which has the solid rod 28 secured therein and extending vertically thereabove to form a guide for the automatic float 29 which controls the operation of the siphon.

The valve housing 27 is expanded at the lower end, and provided in the bottom wall thereof with an opening which is adapted to be closed by the valve 30, carried by the yoke 31, the arms of which extend upwardly and straddle the float 29, and are inserted through sleeves 32 on opposite sides of the float 29, and held for movement therewith by means of lock nuts 33 on the arms of the yoke, which may be adjusted to regulate the control of the yoke 31 by the float 29, and consequently control the operation of the valve 30. The valve 30 has a stem 34, extending upwardly through the housing 27, and passed through a central perforation in a spider 35 in the housing, and also has a disk 36, at the upper end engaging the inner wall of the pipe which connects the housing 27 with the coupling 25, and serves to properly guide the valve 30 to its seat.

The float 29 is open at the top and cup-shaped, and restricted at the bottom as at 37 to reduce the capacity of the lower portion of the float to facilitate draining the contents therefrom, and said float has a central tube 38, which has a water-tight connection with the bottom of the float and slides loosely on the rod 28, so that the float is elevated and depressed in accordance with the quantity of water contained in the float, and when empty serves as a float to lift and seat the valve 30, by reason of the connection of the yoke 31 therewith and when filled owing to the weight of the material of which the float is composed acts as a weight to depress the valve 30, and permit the liquid to flow into the valve housing 27. The upward movement of the float 29 is limited by connection of the yoke 31 therewith, and when the level of the liquid in the receptacle 1 reaches and passes the upper edge of the float 29, the liquid overflows from the receptacle 1 into the float 29, and when sufficiently filled, the float sinks and remains depressed until the liquid has been drained therefrom and the liquid in the receptacle 1 again reaches a point at which the float 29 is buoyed up thereby. In order to drain the liquid from the interior of the float 29 as the liquid is withdrawn from the receptacle 1, I have provided an inverted U-shaped siphon tube 39, having a short arm 40 extending downwardly in the float to a point adjacent the bottom of the contracted portion 37 thereof and having a longer arm 41, which extends downwardly through the bottom of the float to a point beyond the lower extremity of the arm 40, so that as the level of the liquid in the receptacle 1 drops down below the lower end of the arm 40, the U-shaped tube 39 serves as a siphon and drains the liquid from the interior of the float 29 to a point at the lower end of the arm 40 of the U-shaped tube 39.

In order to prevent admission of liquid from the auxiliary tank 2, to the main tank 1 except at the proper time, I have provided the outlet pipe 8 with a valve 85 having a lever 86 connected therewith which is automatically operated to close the valve when the tank 1 is filled to the required level and opens the valve when emptied to the required level.

The closing of the valve 85 is effected by the float 29, when the latter is filled and depressed to open the siphon valve. For this purpose the lever 86 is flattened at the end thereof nearest the float 29 and has the pawl 87 pivoted thereon at 88 and provided at one end with a projection 89, normally lying in the path of movement of the bracket arm 90, which is secured to the top of the float 29. The other end of the pawl 87 is formed with a stem 91, which is normally held against the pin 92 by the spring 93, the arrangement being such that as the float 29 moves upwardly the bracket arm 90 thereon engages the end 89 of the pawl 87, and swings same against the tension of the spring 93 away from the pin 92, allowing the bracket arm 90 to move therebeyond without affecting the position of the valve 85. As the float 29 is depressed, however, the bracket arm 90 strikes against the end 89 of the pawl 87 and as the latter is engaged with the pin 92, the depression of the float swings the valve operating lever 86, and closes the valve 85, whereupon the lever 86 is forced to such position to permit the bracket arm 90 to move downwardly past the end 89 of the pawl 87.

The opening of the valve 85 is effected by the float 13 and for this purpose the lever 86, has a somewhat long arm, the forked end 94 of which straddles the pipe 95, the latter being provided with pins 96, which engage slots 97 with which the arms of the fork are provided. The pipe 95 is mounted to slide vertically on a guide stem 98 which is held in position by means of the end plates 99 and 100 which are secured to the bottom of the tank 1 and the bottom of the tank 2, respectively and there is an arm 101, secured on the lower end of the pipe 95, and extending under the float 13, so that when the float is depressed to the lowermost position it engages the arm 101, and through the connection of the pipe 95, with the lever 86 opens the valve 85.

In order to provide an abrupt interruption of the siphoning action in the outlet pipe 17, whereby the liquid is drained from the main tank 1, there is a relief pipe 42, which is connected to the elbow of the siphon outlet pipe 17, and leads downwardly therefrom to a point at the lowest level to be maintained by the liquid in the tank and preferably a little above the level of the inlet opening through the valve housing 27, and the lower end of this pipe 42, has a float valve 102, which is maintained in position to close the inlet to the pipe 42 by a long stem 103 which projects up in the pipe 42.

This timing device may be used to control the operation of a valve, an electric switch or any other mechanism which it is desired to turn on and off at predetermined times, but I anticipate that it will be used particularly for regulating the supply of heat furnished by a heating system in an apartment or other similar building, and I have shown herein a valve adapted to be used in connection with the timing device and designed particularly for use therewith to control the supply of steam or hot water furnished to the heating elements of the building. This valve is of the disk valve type and comprises a casing 43 with an outlet 44 at each side thereof, and an opening at one side thereof surrounded by a flange 45. A cup-shaped cap 46, which has an inlet opening 47 thereto is provided with a flange 48 which is secured to the flange 45 by means of the bolts 49 and at the juncture of the cap 46 with the casing 43 is the mechanism for controlling the supply of fluid from the inlet opening 47 to the outlet openings 44.

This mechanism comprises the valve disk 50, which is somewhat larger than the opening into the casing 43 from the cap 46 and is provided at its axis with a hub 51 which is clamped on the end of the stem 52 by means of the nut 53 so as to turn with this stem, and this stem projects through the wall of the casing 43 opposite the opening thereinto from the casing 46, and is provided at the exterior of the casing with an operating lever 54, which is pinned thereon as at 55, so that the stem and valve are operated by the lever 54. The valve 50 has a pair of diametrically opposite openings 56 therethrough and the opening into the casing 43, above the valve 50, is provided with a plate 57 having openings 58 therein adapted to register with the openings 56 in the valve and there is a disk 59 of packing material between the plate 57 and the valve disk 50, the rim of which is seated in an annular groove 60, and this disk of packing material is provided with openings therethrough which register at all times with the openings 58 in the plate 57 whereas the valve disk 50 rotates thereagainst and is held against this disk under sufficient pressure to maintain a tight joint therebetween. This pressure is due in part to the pressure of the fluid entering through the inlet opening 47, and pressing against the under surface of the valve disk 50, and an additional positive pressure is applied thereto through a ring 61, which is adapted to slide in the cup-shaped cap 46 to and from the disk 50 and has notches 62 in the periphery thereof which engage the ribs 63 on the inner wall of the cap 46 whereby the ring is held from turning. The outer face of the ring is provided with a plurality of pins 64 and the cap 46 with corresponding pins 65 between which are engaged the coil springs 66 which press the ring 61 against the valve disk 50. The valve openings are arranged substantially as shown in Fig. 16, so as to be opened by a quarter turn of the lever 52, and when the valve is closed, portions of the valve disk 50 overlap portions of the packing disk 59, and the plate 57, so that a considerable turn must be imparted to the stem 52 of the valve before the valve begins to open, this construction being provided for the purpose hereinafter noted.

To provide a tight joint where the stem 52 passes through the wall of the casing 43 the latter is provided with a boss 67 which has the bushing 68 on the stem 52 threaded therein, said bushing having the inner end internally tapered to seat against the tapered face of the annular flange 69 on the stem 52, and provide a tight joint, and there is a lock nut 70 on the bushing 68, which may be turned down to engage the outer end of the boss 67 to lock the sleeve in the adjusted position. The hub 67 is also externally threaded and has a quadrant bracket 71 secured thereon above the axis of the stem 52, as shown in Fig. 14, and a pin 72 projects outwardly at each end of the quadrant bracket 71, and has the lever 54 located therebetween so that the said pins 72, serve as stops, permitting only a quarter turn movement of the stem 52 by the lever 54.

The lever 54 is expanded at the inner end as shown in Fig. 14 to accommodate a pair of outwardly projecting pins 73 and 74, and there is a trip lever 75 loosely mounted on the outer end of the stem 52, and held thereon by means of the nut 76, and this trip lever 75 projects on opposite sides of the stem 52 so as to engage the pins 73 and 74, for actuating the lever 54.

The lever 54 is bored out longitudinally to receive a stem 77 therein, which has a weight 78 at the outer end thereof, the said stem being thereby adjustable longitudinally of the lever 54, and locked in the adjusted position by means of the screw 79, so that the weight 78 exerts a proper leverage to throw the valve 50 as required.

The trip arm 75 is also bored longitudinally and has the rod 80 inserted therein which may be held in the desired position of adjustment by means of the set screw 81, and the rod 80 is extended so as to lie adjacent the rod 16 to which a longitudinal reciprocal movement is imparted by the operation of the float 13 and the rod 80 moves in a plane parallel with the rod 16 and is adapted to be engaged by the pins 82 and 83 between which the rod 80 extends and whereby the lever 75 is operated by the movement of the float 13 to open and close the valve. The rod 16 may, if desired, be provided with a plurality of perforations 84 (see Fig. 14), in which the pins 82 and 83 may be placed to permit adjustment for varying the control of the valve by the float 13.

The operation is as follows:

I will assume that the inlet opening 47 of the valve is connected with a supply pipe 104 from a boiler and that the branch openings 44 are connected to conduct the heating medium either steam or hot water to the various rooms in a building, as for example an apartment building. It will be noted that when the float 13 is depressed the parts of the valve 43 occupy the position shown in full lines in Fig. 14, and in this position the valve is closed. I will assume that the parts are in the position shown in Fig. 2 with the liquid in the receptacle 1 having been previously drawn off and now at the lowest level within the receptacle, and that it is desired to open the valve 43 at a predetermined time and turn on the heat to the building. The pointer 11 is then set to indicate the time to elapse until the heat is to be turned on, for example as in Fig. 1, 15 hours from the time of setting the device in which position the valve 9 is opened to such an extent that it will require 15 hours to fill the tank 1 sufficiently to throw the valve 50. The valve 18 controlling the discharge from the receptacle 1 may also be adjusted by means of the indicator hand 20 for the length of time that the valve 50 is to remain open and the heat turned on, for example 9 hours, as shown in Fig. 1.

Uniform supply of liquid through the valve 9 is assured by reason of the float controlled valve 5 in the auxiliary tank 2, which maintains a uniform level of liquid therein, and a constant pressure to the valve 9. As the liquid enters the main tank 1, the level of the liquid in the receptacle gradually rises and with it the float 13 to which the rod 16 is connected and moves this rod vertically until the pin 83 thereof comes into contact with the rod 80 of the trip lever 75 and the lever 75 is thereafter slowly operated by the elevation of the rod 16. The pin 74 on the enlarged inner end of the lever 54 is barely free of engagement with the lever 75 when said lever is in the lowermost position and as the elevation of the lever 75 begins it is brought into contact with the pin 74 and lifts the arm 54 from engagement with the pin 72 against which it rests and said arm 54 is gradually moved along the quadrant bracket 71. After it is moved past the center thereof the weight 78 automatically throws the lever 54 forward until its movement is arrested by the other stop pin 72, in which position the valve 50 is entirely open. The construction of the device is such that the lever 54 moves past the center of the quadrant 71 and automatically opens the valve at the time for which the indicator 11 is adjusted, and the valve 50 overlaps the packing plate 59 and the plate 57 sufficiently as shown in Fig. 16 so that the valve does not begin to open until the arm 54 nears the point at which it is automatically thrown forward by means of the weight 78 a slight opening only of the valve occurring immediately preceding the time of entire opening, so that the pipes supplied through the valve may be gradually filled previous to the entire opening of the valve and thereby avoid an abrupt inrush of the steam or hot water when the valve is entirely opened.

As the liquid rises in the tank 1, it comes in contact with the float 29, and the float is gradually lifted thereby until the siphon valve 30 is closed thereby, whereupon the float is held from further elevation by the yoke 31, as the liquid continues to rise until the liquid overflows into the float 29, and the arrangement of the parts of the device is such that the float 13 is lifted to the position to throw the lever 54 past center and open the pipe line valve 50 immediately before the liquid overflows into the float 29.

As the float 29 nears the upper position, the bracket arm 90 thereon moves past the pawl 89 as hereinbefore described and the filling of the float 29 then causes the float to sink and open the siphon valve 30 and at the same time the arm 90 engages the pawl 89 and throws the lever 86, so as to close the valve 85, and interrupt further supply of liquid to the receptacle 1.

The elbow of the siphon outlet pipe 17 is just below the level which the liquid reaches in the tank 1 to fill the float 29, and yet high enough so that it is above the level of the liquid when the siphon valve 30 closes, and as soon as the float 29 is depressed and the valve 30 opens, the liquid rises in the siphon pipe 23, and fills the siphon outlet pipe and discharge of liquid begins to take place, the rate thereof being governed by the adjustment of the valve 18.

As the level of the liquid in the main tank 1 lowers, the float 13 and the rod 16 connected therewith are depressed and the spacing of the pins 82 and 83 on the rod 16 is such that as the float 13 nears the lowermost position the pin 82 engages the trip lever 80, which is then in the position shown in dotted lines in Fig. 14, and as the float reaches the lowermost position the weighted arm 77 of the pipe line valve is thrown over center and closes the valve 50. The lowermost position of the float 13 is determined by the position of the lower end of the siphon relief pipe 42 as the lowering of the water below the mouth of the pipe 42 allows the float valve 102 to drop downwardly, whereupon air is admitted to the elbow of the siphon outlet pipe and the siphon broken so that an immediate interruption of the flow of liquid from the main tank 1 occurs and no further flow can take place until the level of liquid therein is again raised to a point above the siphon pipe elbow.

In order to admit liquid from the auxiliary tank 2 to again fill the main tank 1, the arm 101 on the pipe 95, is set to be engaged by the float 13, and throw the valve 85 to the open position simultaneously with the opening of the siphon relief valve 102, whereupon the main tank again fills at the rate for which the indicator hand 11 is set and after a partial rise of liquid in the tank 1, the float 29 is elevated thereby and closes the siphon valve 30 and the device is then ready for further automatic operation in the manner just described.

Thus it will be observed that I have provided a device which is entirely automatic and may be adjusted to effect a certain operation such as turning on the heat at a predetermined time, and leave it on for a predetermined time, whereupon the device again acts automatically to turn it off and automatically continues the alternate turning on and turning off as long as desired.

While I have shown and described my invention in a preferred form, I am aware that many changes and modifications may be made therein without departing from the principles of my invention, and I therefore do not purpose limiting the patent granted hereon otherwise than necessitated by the prior art.

I claim as my invention:

1. In an automatic controller, the combination of a receptacle having a float therein adapted to control the operation of a mechanism, and an inlet valve and an outlet valve for the receptacle, each being provided with a graduated scale for effecting adjustments of the valves to fill and empty the receptacle during predetermined intervals of time to regulate the operation of said mechanism.

2. In an automatic controller, the combination of a receptacle having a float therein adapted to control the operation of a mechanism, an inlet and an outlet valve for the receptacle, each having a graduated scale for effecting adjustments of the valves to fill and empty the receptacle during predetermined intervals of time to operate the float to control said mechanism, and means for automatically interrupting the supply to the receptacle during the discharge therefrom.

3. In an automatic controller, the combination of a main receptacle having an outlet valve, an auxiliary tank having an outlet valve discharging into the main tank, and a float controlled inlet valve for maintaining a uniform level of liquid in the auxiliary tank, means for adjusting said outlet valves to continuously fill and empty the main tank in predetermined periods of time, and a float in the main tank controlled by the level of liquid therein for controlling the operation of a mechanism.

4. In an automatic controlling device, the combination of a receptacle having a siphon outlet pipe operable at a predetermined level of liquid in the receptacle to discharge the contents thereof, a valve in said outlet pipe, and an inlet valve for the receptacle, said valves having means of adjustment for filling and emptying the receptacle in predetermined periods of time, and a float in the receptacle for controlling the operation of a mechanism.

5. In an automatic controlling device, the combination of a receptacle, a float therein for controlling the operation of a mechanism, inlet and outlet valves for regulating the level of liquid in the receptacle and controlling the operation of the float, and an auxiliary float adapted to automatically fill and empty and control the outflow from the receptacle.

6. In an automatic controlling device, the combination of a receptacle having a valve controlled siphon outlet pipe and a valve controlled inlet, means for adjusting said valves to fill and empty the receptacle in predetermined periods of time, a float in the receptacle operable by changes of level of the liquid in the receptacle to operate a mechanism, means for automatically interrupting the supply of water to the receptacle during the discharge therefrom, and an auxiliary float operable to control the flow of liquid from the receptacle to the siphon outlet pipe.

7. In an automatic controlling device, the combination of a receptacle having a float therein for controlling the operation of a mechanism, an inlet valve and an outlet valve for the receptacle, both having a dial for regulating the adjustment of said valves to fill and empty the receptacle in predetermined periods of time, an auxiliary float for controlling the outlet from the receptacle during the inflow, and means operated by the auxiliary float for controlling the inlet.

8. In an automatic controlling device, the combination of a receptacle, a siphon outlet pipe, a valve controlled inlet to the receptacle and a valve for the outlet pipe, both adjustable to fill and empty the receptacle in predetermined periods of time, a float in the receptacle operable by the rise and fall of liquid in the receptacle to control a mechanism, and a relief pipe connected to the upper portion of the siphon outlet pipe and leading downwardly in the receptacle and having a float valve controlling the inlet to said pipe.

9. In an automatic controller, a receptacle having a float therein adapted to control the operation of a mechanism, a second receptacle, means for maintaining a constant head of fluid in said second receptacle, means for allowing fluid to flow at a predetermined rate from the second receptacle into the first to fill the latter, means for periodically emptying the latter and means for interrupting said flow during the emptying of the first receptacle.

10. In a automatic controller, a receptacle having a float therein adapted to control the operation of a mechanism, means for filling the receptacle at a predetermined rate, means for emptying the receptacle at a predetermined rate, said last mentioned means being inoperative during the filling period.

11. In an automatic controller, a receptacle having a float therein adapted to control the operation of a mechanism, means for filling the receptacle at a predetermined rate, means for emptying the receptacle at a predetermined rate, each of said means being inoperative during the operation of the other means.

12. In an automatic controller, a receptacle having a float therein adapted to control the operation of a mechanism, means for filling the receptacle at a predetermined rate, means for emptying the receptacle at a predetermined rate, said filling means being inoperative during the emptying period.

13. In an automatic controller, a receptacle having a float therein adapted to control the operation of a mechanism, means for emptying the receptacle during a predetermined period of time including a siphon and means for preventing operation of the latter until the level of fluid in the receptacle is considerably higher than the highest point in the siphon.

14. In an automatic controller, a receptacle having a float therein adapted to control the operation of a mechanism, means for emptying the receptacle in a predetermined interval of time including a siphon and means for introducing air into the upper part of the siphon to break the siphon prior to the time at which the siphon would normally break.

15. In an automatic controller, a receptacle having a float therein adapted to control the operation of a mechanism and gravity operated means for automatically filling and emptying the receptacle at predetermined times.

16. In an automatic controller, a receptacle having a float therein adapted to control the operation of a mechanism, a second receptacle, means for maintaining a constant head of fluid in said second receptacle, and means for allowing fluid from said second receptacle to flow into the first receptacle at a predetermined rate to fill the latter and means for periodically emptying the latter.

17. In an automatic controller, a receptacle having a float therein adapted to control the operation of a mechanism, means for filling the receptacle with fluid at a predetermined rate, means for emptying the receptacle, a second float in the receptacle adapted to interrupt the flow of fluid into the receptacle during the emptying of the latter and means operated by the first float for continuing said flow when the receptacle has emptied.

18. In an automatic controller, a receptacle having a float therein adapted to control the operation of a mechanism by alternately filling and emptying the receptacle with fluid at predetermined intervals of time, a valve for interrupting the flow of fluid to said receptacle and a second float in the receptacle for closing this valve while said receptacle is emptying.

19. In an automatic controller, a receptacle, valves for alternately filling and emptying the receptacle at predetermined rates to control the operation of a mechanism and a float in the receptacle adapted to be alternately filled and emptied for operating said valves alternately.

20. An automatic controller including a receptacle and means for alternately filling and emptying the receptacle at predetermined rates automatically for an indefinite period to control the operation of a mechanism, each of said means being inoperative during the operation of the other means.

21. In an automatic controller, a receptacle, valves for alternately filling and emptying the receptacle at predetermined rates to control the operation of a mechanism, a float in the receptacle having a spillway for flow of fluid into the float to allow the latter to fall, and a siphon adapted to empty the float as the receptacle is emptied to allow the float to rise again, and means operated by the movement of the float for operating said valves.

22. An automatic controller including a receptacle, a second receptacle, means for maintaining a constant head of fluid in the second receptacle, means for allowing fluid from the latter to flow into the first receptacle at a predetermined rate, means for periodically emptying the first receptacle, and means operated by the rise and fall of fluid in the first receptacle for controlling the operation of a mechanism.

23. In an automatic controller, a receptacle having a float therein adapted to control the operation of a mechanism, means for supplying fluid to said receptacle at a constant pressure, means for checking the flow of said fluid at a predetermined time, and mechanism put in operation for emptying said receptacle at substantially said predetermined time.

24. The combination with a device to be controlled, of automatic fluid actuated mechanisms comprising means for controlling said device after a plurality of differing predetermined time intervals.

In testimony whereof I have hereunto subscribed my name in the presence of two subscribing witnesses.

ALEXANDER McKIBBIN.

Witnesses:
 EARL M. HARDINE,
 CHARLES W. HILLS, Jr.